United States Patent Office 3,810,956
Patented May 14, 1974

3,810,956
ANTI-ELECTROSTATIC POLYAMIDES CONTAINING A URETHANE DERIVATIVE OF A POLYETHER
Isao Kimura and Fumimaro Ogata, Osaka, and Koichiro Ohtomo, Settsu, Japan, assignors to Kanegafuchi Boseki Kabushiki Kaisha, Tokyo, Japan
No Drawing. Filed Apr. 20, 1970, Ser. No. 30,284
Claims priority, application Japan, Apr. 24, 1969, 44/32,207, 44/32,208; July 12, 1969, 44/55,318
Int. Cl. C08g 20/20
U.S. Cl. 260—857 R                23 Claims

ABSTRACT OF THE DISCLOSURE

A synthetic thermoplastic fiber-forming polymer having durable anti-electrostatic and hydrophilic properties to withstand repeated launderings, which comprises polyamide, and which uniformly contains 0.1–30% by weight based on said polyamide of at least one urethane derivative of polyether which is a reaction product of a diisocyanate and a mono- or di-ol type polyalkylene-ether or its derivative. Processes for its manufacture and fibers comprising the polymer have been also proposed.

---

This invention relates to a synthetic thermoplastic fiber-forming polymer and in particular, polyamide, which is provided with durable anti-electrostatic and hydrophilic properties and fibers made therefrom.

Heretofore, there have been known numerous synthetic fibers comprising a thermoplastic synthetic linear polymer, and those consisting of a polyamide, which have been manufactured on the largest industrial scale are extremely hydrophobic as compared with natural fibers, so that the many drawbacks as well as advantageous features of those synthetic fibers resulting from their hydrophobicity cannot be overlooked. Namely, hydrophobic fibers and clothes made therefrom have disadvantages such as a waxy feeling, a poor fit, an aptitude to be grease stained, a difficulty to remove stains, and a likelihood of becoming electrostatically charged by friction which causes attraction of dust and various uncomfortable wearing properties. All of such disadvantages closely relate to the hydrophobicity of fibers.

In order to obviate such a hydrophobicity and its resultant drawbacks of synthetic fibers, numerous improved synthetic fibers having antielectrostatic and hydrophilic properties have so far been proposed. However, most of those proposals comprise providing temporarily, by a surface treatment, synthetic fibers or textile products made therefrom with antielectrostatic and hydrophilic properties which hardly withstand launderings or other after-treatments. The rest of the proposals are to incorporate an antielectrostatic or hydrophilic agent into a synthetic fiber prior to its spinning, in most cases, such a fiber has been denatured with respect to its excellent characteristics inherent in its component polymer. As mentioned above, conventional processes for improving hydrophilic properties of synthetic fiber-forming polymers and fibers made therefrom have not always been satisfactory.

In more particular, there were tremendous numbers of proposals, in the fast, for modifying synthetic fibers by utilizing a polyoxyalkylene glycol such as, for a representative example, polyoxyethylene glycol (hereinafter referred to as PEG), or a derivative thereof, and in particular, those relating to an improvement of hydrophilic property of synthetic fibers were made, for instance, in Japanese patent application publication Nos. 7,692/1951, 15,912/1960, 23,349/1963, 5,214/1964, 16,671/1964, 13,568/1966 and 20,475/1968, Dutch patent specification No. 65–10,468, etc.

The processes for modifying synthetic fibers which have been proposed in the above disclosures can be classified into the following items:

(1) A process wherein a thermoplastic polymer such as a polyamide is blended with PEG itself, under a molten condition during or after completion of its polycondensation.

(2) A process wherein PEG is halogenated and thereafter reacted with a nitrogenous compound such as ammonia and a diamine, or is cyanoalkylated and thereafter hydrogenated to convert the resulting nitrile groups into amino groups, and a finally resulted polyether diamine is incorporated and combined with a polyamide.

(3) A process wherein using an appropriate oxidizing agent, primary alcoholic hydroxyl end groups of PEG are oxidized into carboxylic groups and the resulted polyether dicarboxylic acid is employed for modifying a polymer.

(4) A process wherein PEG is reacted, at its hydroxyl end groups, with a diisocyanate to form a polyether diisocyanate and raw materials for polyamide, such as epsilon-caprolactam is polymerized in the presence of the above obtained polyether diisocyanate together with an alkali catalyst, to produce a modified polyamide.

However, according to the process (1) above, since the PEG is only mixed but not chemically combined with the polymer, a fiber comprising the PEG modified polymer which has been provided with a hydrophilic property loses it through a washing treatment whereby the PEG readily comes off. Thus, the hydrophilic property provided thereto is deficient in durability and very unstable.

In synthesizing the polyether diamine which is to be mixed and combined with a polyamide, in the above process (2), it is difficult to effect quantitatively the halogenation or the cyanoalkylation reactions of the end groups of the PEG, restraining side reactions and moreover, there has not so far been known a process for separating the objective polyether diamine with a high purity.

Further, in preparing the polyether dicarboxylic acid employed in the process (3), it is as difficult as in the case of the aforementioned process (2) to quantitatively control the reaction of the end groups of PEG and the separation of the objective substance with a high purity is also impossible.

In the process (4), for instance, epsilon-caprolactam undergoes an ionic polymerization in the presence of the polyether diisocyanate and the alkali catalyst. However, in such a reaction system, the isocyanato groups react even with amide groups of the polymer during its polymerization, whereby a linear structure of the resulting polymer is deformed. When such a polymer is spun and the formed yarn is drawn, not only much difficulty is encountered in those processes, but also the resultant synthetic fiber yarn is not always provided with various superior properties which are inherent in the polymer.

Whereas, according to the present invention, a hydrophilic property can be readily provided to a synthetic thermoplastic linear condensation polymer, by incorporating thereinto a urethane derivative of a mono- or di-ol type polyether, without being attended with such difficulty as in the conventional processes. Namely, the inventors have carried out extensive studies on provision of fibers composed of a synthetic thermoplastic polyamide with superior antielectrostatic and hydrophilic properties, without denaturing their inherent excellent characteristics, and have accomplished the present invention.

An object of the present invention is to provide fibers comprising a synthetic thermoplastic polyamide, with improved antielectrostatic and hydrophilic properties which withstand repeated launderings.

Another object of the present invention is to provide synthetic fibers having exceedingly durable antielectrostatic and hydrophilic properties, substantially not denaturing their other inherent, desirable properties.

Further objects will appear hereinafter.

Namely, the present invention is a synthetic thermoplastic fiber-forming polymer having durable antielectrostatic and hydrophilic properties, which comprises polyamide, and which uniformly contains 0.1-30% by weight, based on said condensation polymer, of at least one urethane derivative of polyether selected from the group consisting of:

$$R_2(OR_1)_nO\text{—}CONHR_3NCO \quad (1)$$

$$R_2CO(OR_1)_nO\text{—}CONHR_3NCO \quad (2)$$

$$OCNR_3NHCO\text{—}(OR_1)_nO\text{—}CONHR_3NCO \quad (3)$$

$$R_2(OR_1)_nO\text{—}CONHR_3NHCO\text{—}NHR_4COOR_6 \quad (4)$$

$$R_2CO(OR_1)_nO\text{—}CONHR_3NHCO\text{—}NHR_4COOR_6 \quad (5)$$

$$R_2(OR_1)_nO\text{—}CONHR_3NHCO\text{—}OR_4COOR_6 \quad (6)$$

$$R_2CO(OR_1)_nO\text{—}CONHR_3NHCO\text{—}OR_4COOR_6 \quad (7)$$

$$R_6OOCR_4NH\text{—}CONHR_3NHCO\text{—}(OR_1)_nO$$
$$\text{—}CONHR_3NHCO\text{—}NHR_4COOR_2 \quad (8)$$

$$R_6OOCR_5O\text{—}CONHR_3NHCO\text{—}(OR_1)_nO$$
$$\text{—}CONHR_3NHCO\text{—}OR_5COOR_6 \quad (9)$$

$$R_2(OR_1)_nOCONHR_3NHCO\text{—}X \quad (10)$$

$$R_2CO(OR_1)_nOCONHR_3NHCO\text{—}X \quad (11)$$

and $$X\text{—}CONHR_3NHCO(OR_1)_nOCONHR_3NHCO\text{—}X \quad (12)$$

where, $n$ is an integer of 4-460; $OR_1$ denotes an alkyleneether group having 1-18 carbon atoms; $R_2$ denotes hydrogen atom, an alkyl group having 1-18 carbon atoms, an aryl group or a cycloalkyl group having 1-18 carbon atoms; $R_3$ denotes an alkylene, phenylene or cycloalkylene group having 1-18 carbon atoms; $R_4$ and $R_5$ denote an alkylene or phenylene group having 1-12 carbon atoms; $R_6$ denotes hydrogen atom or an alkyl group having 1-12 carbon atoms; and X denotes a residue of aminosulphonic acid or hydroxysulphonic acid or of an alkali metal salt thereof.

The synthetic thermoplastic fiber-forming polymer of the present invention is obtained by incorporating the above mentioned urethane derivative of polyether uniformly into the condensation polymer before, during or after its polycondensation reaction.

The above mentioned urethane derivative of polyether to be applied to the present invention is a reaction product of a diisocyanate containing $R_3$ group and a mono- or di-ol type polyether having a general formula of $$R_2(OR_1)_nOH \text{ or of } R_2CO(OR_1)_nOH$$

wherein $n$ is an integer of 4-460, preferably of 9-230; $OR_1$ is an alkyleneether group having 1-18 carbon atoms; and $R_2$ is hydrogen atom, an alkyl group having 1-18 carbon atoms, an aryl group or a cycloalkyl group; or a product obtainable by further reacting the above mentioned reaction product with an aminocarboxylic acid or an hydroycarboxylic acid, or with an aminosulphonic acid or an hydroxysulphonic acid denoted by X as hereinafter explained. The above mentioned polyether carboxylic acid and polyether sulphonic acid or their esters may be in a form of an alkali metal salt or of an alkaline earth metal salt, if required.

As already mentioned above, the $OR_1$ denotes an alkyleneether group having 1-18 carbon atoms, while the $(OR_1)_n$ may be a mixture of a plurality of aliphatic ethers differing in their carbon number. For instance, the $(OR_1)_n$ may be a mixture of $$\text{\textendash}(OCH_2CH_2)_n\text{\textendash} \text{ and } \text{\textendash}(OCH(CH_3)CH_2)_n\text{\textendash},$$

or may be a random or a block copolymer thereof. From a practical point of view, the most preferable are polyethyleneoxide, polypropyleneoxide, polytetramethyleneoxide, and block and random copolymers of ethyleneoxide and propyleneoxide.

The $R_2$ denotes: hydrogen atom; an alkyl group having 1-18 carbon atoms such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl and the like; an aryl group such as phenyl or its derivatives having the general formula

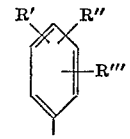

wherein R', R'' and R''' are hydrogen atoms or alkyl groups having 1-15 carbon atoms, and a naphthyl group and the like; and a cycloalkyl group having 1-18 carbon atoms such as cyclopropyl, cyclobutyl, cyclopentyl, cyclohexyl, cycloheptyl, cyclooctyl, cyclononyl, cyclodecyl, cycloundecyl, cyclododecyl and the like. The phenyl and its derivatives are, for instance, residues represented by omitting a hydroxyl group from phenols such as phenol, n-butylphenol, iso-butylphenol, amylphenol, dibutylphenol, diamylphenol, tripropylphenol, heptylphenol, octylphenol, nonylphenol, decylphenol, undecylphenol, dodecylphenol, tetradecylphenol, cetylphenol, oleylphenol, octadecylphenol, dihexylphenol, trihexylphenol, diisoheptylphenol, dioctylphenol, dinonylphenol, didodecylphenol and the like, or from cresols having methyl group(s) combined to aromatic nucleus of the above mentioned phenols.

The $R_3$ is an alkylene, phenylene or cycloalkylene group having 1-18 carbon atoms. As the diisocyanates having the $R_3$ group between their two isocyanato groups which are to react with a mono- or di-ol type polyether, mention may be made of: an aliphatic diisocyanate such as, for instance, methane diisocyanate, ethane diisocyanate, propane diisocyanate, butane diisocyanate, butene diisocyanate, pentane diisocyanate, β-methylbutane diisocyanate, hexane diisocyanate, dipropylether diisocyanate, heptane diisocyanate, dimethylpentane diisocyanate, methoxyhexane diisocyanate, octane diisocyanate, trimethylpentane diisocyanate, nonane diisocyanate, decane diisocyanate, butoxyhexane diisocyanate, butylene glycol dipropylether, ω,ω'-diisocyanate, undecane diisocyanate, dodecane diisocyanate, tridecane diisocyanate, tetradecane diisocyanate, pentadecane diisocyanate, hexadecane diisocyanate, heptadecane diisocyanate, octadecane diisocyanate, and the like; a diisocyanate containing an aromatic or alicyclic ring in its molecule such as ω,ω'-diisocyanato-dimethylbenzol for instance, meta- or para-xylylene diisocyanate,
ω,ω'-diisocyanatodimethylcyclohexane,
ω,ω'-diisocyanato-diethylbenzol,
ω,ω'-diisocyanato-dimethylnaphthalene,
ω,ω'-diisocyanato-diethylnaphthalene,
1-ω-methylisocyanato-2-ω-n-propyl-isocyanato-
  dimethylcyclohexane,
ω,ω'-diisocyanato-propylbiphenyl and the like; and an aromatic diisocyanate such as phenylene diisocyanate, methylbenzol diisocyanate, dimethylbenzol diisocyanate, diethylbenzol diisocyanate, isopropylbenzol diisocyanate, n-propylbenzol diisocyanate, diisopropylbenzol diisocyanate, naphthalene diisocyanate, biphenyl diisocyanate, dimethylbiphenyl diisocyanate, dimethoxybiphenyl diisocyanate, diphenylmethane diisocyanate, methyldiphenylmethane diisocyanate, diphenyldimethylmethane diisocyanate, tetramethyldiphenylmethane diisocyanate, cyclohexyl di(isocyanato-phenyl)methane, dimethoxydiphenylmethane diisocyanate, dimethoxyphenylmethane diisocyanate, diethoxydiphenylmethane diisocyanate, dimethyldimethoxydiphenylmethane diisocyanate, benzophenone diisocyanate, diphenylethane diisocyanate and the like.

The $R_4$ and $R_5$ represent alkylene groups, phenylene groups or groups having the following general formula:

$$-(CH_2)_m-\langle\bigcirc\rangle-(CH_2)_m-$$

where, $m$ is an integer of 1 or 2.

The $R_6$ represents hydrogen atom or an alkyl group having 1–12 carbon atoms.

The X is a residue of aminosulphonic acid or hydroxysulphonic acid or of an alkali metal salt thereof which is represented by omitting a hydrogen atom of its amino or hydroxyl group. The sulphonic acid or its salt has a molecular structure comprising an amino group containing at least one active hydrogen atom or a hydroxyl group and at least one $-SO_3M$ group wherein M denotes hydrogen atom or an alkali metal, and which may further comprises a carboxylic acid or its derivative represented by the formula $-COOR^{IV}$. In more particular, the following compounds are most suitable:

Aliphatic compounds $$H-NR^VSO_3M$$
$$\quad\quad|$$
$$\quad\quad Y$$

and $HOR^VSO_3M$ where, $R^V$ represents $$-CH_2-CH-CH_2-COOR^{IV}$$

$$-(CH_2)_a-(CH)_b(CH_2)_p-,\quad -(CH)_b-(CH_2)_{a+p}-$$
$$\quad\quad\quad|\quad\quad\quad\quad\quad\quad\quad\quad|$$
$$\quad\quad COOR^{IV}\quad\quad\quad\quad\quad COOR^{IV}$$

or $$-(CH_2)_{a+p}-(CH)_b-;$$
$$\quad\quad\quad\quad\quad|$$
$$\quad\quad\quad\quad COOR^{IV}$$

$R^{IV}$ represents hydrogen atom, an alkali metal or a lower alkyl group such as methyl, ethyl and the like; and Y represents hydrogen atom or a lower alkyl group such as methyl, ethyl and the like, wherein relations, $a+p=1$ to 5 and $b=0$ to 1 are satisfied.

Alicyclic compounds $$H_2N(CH_2)_a-\langle\text{ring}\rangle\begin{matrix}(SO_3M)\\ [(CH_2)_p COOR^{IV}]_q\end{matrix}$$

and $$HO(CH_2)_a-\langle\text{ring}\rangle\begin{matrix}(SO_3M)_b\\ [(CH_2)_p COOR^{IV}]_q\end{matrix}$$

wherein relations, $a=0$ to 3, $b=1$ to 3, $p=0$ to 1 and $q=0$ to 1 are satisfied and $R^{IV}$ represents the same as above.

Aromatic compounds $$H_2N(CH_2)_a-\langle\bigcirc\rangle\begin{matrix}(SO_3N)_b\\ [(CH_2)_p COOR^{IV}]_q\end{matrix}$$

$$HO(CH_2)_a-\langle\bigcirc\rangle\begin{matrix}(SO_3M)_b\\ [(CH_2)_p COOR^{IV}]_q\end{matrix}$$

$$H_2N(CH_2)_a-\langle\bigcirc\bigcirc\rangle-[(CH_2)_p COOR^{IV}]_q\quad (SO_3M)_b$$

and $$HO(CH_2)_a-\langle\bigcirc\bigcirc\rangle-[(CH_2)_p COOR^{IV}]_q\quad (SO_3M)_b$$

wherein relations, $a=0$ to 3, $b=0$ to 3, $p=0$ to 1 and $q=0$ to 1 are satisfied and $R^{IV}$ represents the same as above.

Besides the above mentioned organic compounds, exceptionally, $NaHSO_3$ is also suitable for the X.

The urethane derivative of polyester to be applied to the present invention is readily obtainable quantitatively through a reaction between a mono- or di-ol type polyether and a diisocyanate, or to the obtained urethane further adding an amino- or hydroxy-carboxylic acid or an amino- or hydroxy-sulphonic acid. Now, as an example, a reaction for deriving the urethane derivative, e.g., a polyether carboxylic acid or its ester from a diol type polyether will be illustrated referring to chemical equations hereafter. In the case of a mono-ol type polyether, an equi-molar reaction between the polyether and a diisocyanate takes place and from the resulting reaction product a polyether carboxylic acid or its ester is derived.

$$H(OR_1)_nOH+2\cdot CONR_3NCO \rightarrow CONR_3$$
$$NHCO(OR_1)_nOCONHR_3NCO \quad (3)'$$

$$(3)'+2\cdot R_6COOR_4NH_2$$
$$\rightarrow R_6COOR_4NH-CONHR_3NHCO-(OR_1)_nO-$$
$$CONHR_3NHCO-NHR_4COOR_6 \quad (8)'$$

$$(3)'+2\cdot HOR_5COOR_6 \rightarrow R_6OOCR_5O$$
$$-CONHR_3NHCO-(OR_1)_nO-$$
$$CONHR_5NHCO-OR_5COOR_6 \quad (9)'$$

In lieu of the above mentioned $R_6COOR_4NH_2$, the following compounds may be used.

$$HN-\langle\text{ring with O}\rangle-COOR_4$$

and $$HN-\langle\text{ring with N}\rangle-COOR_4$$

Further, typical examples of the compounds shown in Formulae 10 and 12 are expressed as follows:

$$CH_3O-(CH_2CH_2O)_n-CONH-\langle\bigcirc\rangle\begin{matrix}CH_3\\ NHCO\cdot O-\langle\bigcirc\rangle-CO\cdot OCH_3\\ SO_3Na\end{matrix} \quad (10)'$$

$$NaO_3S(CH_2)_2-NHCONH-\langle\bigcirc\rangle-CH_2-\langle\bigcirc\rangle-NHCO-$$
$$O(CH_2CH_2O)_n-CONH-\langle\bigcirc\rangle-CH_2-\langle\bigcirc\rangle-NHCONH-$$
$$(CH_2)_2SO_3Na \quad (12)'$$

In the process of the present invention, the amount of the urethane derivative of polyether to be incorporated into the condensation polymer, i.e., polyamide, is 0.1–30%, preferably 0.5–15% and more preferably 1–10% by weight based on the condensation polymer.

In the case when the above mentioned amount is smaller than 0.1% by weight, the polymer cannot be provided with a sufficient hydrophilic property, while when the amount is in excess of 30% by weight, the viscosity of the polymer is decreased to be insufficient for melt-spinning and the lowering of melting point of the polymer is large, whereby in either case, spinning and drawing processes will be attended with difficulty, so that a synthetic fiber having excellent properties inherent in the condensation polymer is not obtainable.

As far as the amount of the urethane derivative of polyether incorporated into the condensation polymer is in the above mentioned range, an excellent durable hydrophilic property as well as an anti-electrostatic property can be provided to the polymer, i.e., a polyamide, without substantial deterioration of excellent properties inherent in the polymer, such as, for instance, high tenacity, elongation, tensile elasticity and dye receptivity of polyamides.

The above mentioned urethane derivative of polyether may be in any form of liquid, grease and wax, and it may be also employable in the form of an aqueous dispersion.

When the condensation polymer is a polyamide, the urethane derivative of polyether may be incorporated either with raw materials for the polyamide prior to or during the polycondensation reaction or with the molten polyamide after the polycondensation reaction. Or, an excess of the urethane derivative may be admixed or reacted, in advance, with raw materials for the polyamide, to form a prepolymer which also can be incorporated with the polyamide in any time as mentioned above. In case of polyamide, a polymer chip and the urethane derivative can be blended mechanically in a predetermined proportion by mixing in a mixer or by kneading in a conventional mono- or multiscrew extruder, and the blend can be melt extruded from nozzles in a form of a band which is cut into chips again or can be melt spun to form a filament yarn which is wound on a bobbin. Furthermore, a fairly large excess of the urethane derivative may be incorporated with the polymer, to prepare, in advance, a so-called master chip of high content of the urethane derivative, and then the thus obtained master chip and a polymer chip containing no urethane derivative can be blended mechanically, or re-melted separately in respective melters and blended in a conventional extruder to form a blended chip or conjugately spun to form a so-called conjugate filament yarn.

The urethane derivatives of polyether shown in general Formulae 1–3 are effective particularly for improvement of polyamides. The aforementioned incorporation processes and conditions will be illustrated in more details hereinafter with respect to the case of a polyamide and the urethane derivatives (1)–(3).

As already mentioned above, these urethane derivatives may be incorporated into the polyamide in any stage of its manufacture. However, it is preferable that the urethane derivative and polyamide-forming materials are reacted with each other at 80–100° C. for 1–2 hours prior to the polycondensation reaction and that the isocyanato end groups of the urethane derivative are blocked in advance. In such a case, polyamide-forming materials which have been admixed with the urethane derivative are heated and melted into a homogeneous phase, and then cooled down to a temperature of 80–100° C. at which the monomer or prepolymer of polyamide and the urethane derivative react with each other for 1–2 hours. The urethane derivatives may be added to molten polyamide-forming materials which contain no urethane derivatives.

On the other hand, when the urethane derivative is added during the polycondensation reaction of the polyamide, preferably it is added at around the end of the polycondensation reaction where an inter-reaction between the polyamide and the urethane derivative is effected, for instance, at about 260° C. and terminated within an hour.

Further, in the case of an incorporation after the polycondensation reaction, attention should be paid to reaction conditions so as to prevent an excessive reaction between the polyamide and the urethane derivative, such as a reaction temperature of 240–260° C. and a reaction time of 40 minutes, preferably 15–30 minutes.

In all above mentioned cases, the polyamide or its raw materials and the incorporated urethane derivative are firmly combined with each other, and however, an excessive reaction between those which is to deteriorate desirable properties inherent in the polyamide should be restrained.

In the process of the present invention, it is preferred that the urethane derivative is added to the polyamide substantially under no influence of water and, in particular, a consideration should be given in cases of incorporation during and after the polycondensation reaction.

Therefore, the most advantageous is a process wherein a polyamide chip and the urethane derivative are melt blended with each other, extruded in a form of a band which is cut into chips, the formed chip is washed or not washed with water and finally dried to prepare a chip free from an influence of water.

In the present invention, the above mentioned polyamides are homopolyamides and copolyamides obtained by polycondensing at least one amide-forming compound selected from the group consisting of lactams, ω-aminocarboxylic acids, and salts of a diamine and a dicarboxylic acid, in particular, for instance, ε-caprolactam, ε-aminocaproic acid and a nylon salt obtained from an arbitrary combination of a diamine such as an $\alpha,\omega$-aliphatic diamine, e.g., hexamethylene diamine, a heterocyclic diamine, e.g., piperazine, dimethylpiperazine and N,N'-substituted ring containing diamine derived therefrom, an alicyclic diamine represented by bis(p-aminocyclohexyl)methane or the like and an aromatic ring containing diamine, e.g., m - xylylenediamine and p-xylylenediamine, with a dicarboxylic acid such as an aliphatic dicarboxylic acid, e.g., adipic acid, sebacic acid, azelaic acid, 1,10-decane dicarboxylic acid, etc., a ring containing dicarboxylic acid, e.g., terephthalic acid, isophthalic acid and alicyclic acid obtained by hydrogenating the aromatic ring thereof.

Among the polyamide as mentioned above, preferable in the present invention is a polycondensation product of γ-butylolactam, δ-valerolactam, ε-caprolactam, heptolactam, 6-aminocaproic acid, 7-aminoheptanoic acid, 9-aminononanoic acid, 11-aminoundecanoic acid or a nylon salt consisting of tetramethylene diamine, pentamethylene diamine, hexamethylene diamine, heptamethylene diamine, octamethylene diamine, nonamethylene diamine, decamethylene diamine, undecamethylene diamine, dodecamethylene diamine, m-xylylene diamine, bis(γ-aminopropyl)ether, N,N'-bis(ω-aminopropyl) piperazine or 1,11-diaminoundecane, and terephthalic acid, isophthalic acid, glutaric acid, adipic acid, pimelic acid, suberic acid, azelaic acid, sebacic acid, dodecane dicarboxylic acid, hexahydroterephthalic acid, diphenylene-4,4' - dicarboxylic acid, diphenylmethane-4,4'-dicarboxylic acid or diphenylether-4,4'-dicarboxylic acid.

The above mentioned polyamides, may contain, as additives, inorganic or organic substances such as delustrants, pigments, dye stuffs, light stabilizers, fluorescent whitening agents, heat stabilizers, plasticizers, etc., if required.

The urethane derivative of polyether to be incorporated into a thermoplastic synthetic linear condensation polymer such as a polyamide, shows an excellent compatibility and satisfactory miscibility with those polymers, so that there never occurs an uneven mixing or combination or a phase separation during the steps of polymerization, melt blending or of melt spinning.

The polymer of the present invention improves its hydrophilic property to a large extent and which property has a durability to withstand repeated launderings.

When the polymer consisting of the urethane derivative of polyether and a synthetic linear condensation polymer is solely melt-spun or co-spun with a polymer same as above which does not have the urethane derivative incorporated thereinto or with a different polymer and the formed filament is subjected to a drawing process, then a synthetic fiber having excellent anti-electrostatic and hydrophilic properties is manufactured. In particular, a conjugate fiber which consists of at least two adherent and distinct components extending uniformly along the fiber axis, said one component comprising a thermoplastic synthetic fiber-forming linear condensation polymer as hereinbefore described and another component comprising the aforementioned polymer of the present invention, has advantageous properties such as combined characteristics of those conjugated polymers and an excellent crimpability upon a heating or swelling treatment in the case when said components are arranged in a side by side or eccentric sheath-core relationship in the cross-section of the unitary filament, and it also possesses excellent anti-electrostatic and hydrophilic properties as long as the said polymer of the invention exists continuously along the fiber axis, even if it occupies a rather small portion of the fiber.

As mentioned above, the fibers of the present invention have obviated any drawbacks caused by a deficiency of antielectrostatic and hydrophilic properties in conventional synthetic fibers and have overcome defects of conventional processes for imparting temporary antielectrostatic and hydrophilic properties to synthetic fibers. In particular, the fibers of the present invention have not any wearing uncomfortableness inherent in hydrophobic fibers and have a hand similar to natural fibers, and therefore, they are suitable as materials for various garments, upholsteries, industrial goods, etc., in a form of fibers or other shaped articles.

The present invention will be illustrated in more detail according to the following examples. In the examples, "part" or "percent" means by weight, and the notation $[\eta]$ represents an inherent viscosity determined in a metacresol solvent at 30° C. in the case of a polyamide.

As test-pieces for determinations of water absorbency and voltage of triboelectricity of fibers, use was made of a drawn yarn which was washed in 0.2% aqueous solution of a household abluent at 80° C. for 30 minutes, rinsed repeatedly five times in hot water and dried.

The voltage of triboelectricity of fibers was determined according to the following manner:

A test-piece of yarn was conditioned for 24 hours in an atmosphere of 20° C., 65% R.H. and thereafter passed rubbing on a titan porcelainous body at a running speed of 100 meters per minute under a constant tension exerted thereupon by a tension washer, to generate triboelectricity, the voltage of which was measured by an electrostatic induction method by means of a rotatory sector.

EXAMPLE 1

0.1 mol of polyethylene glycol having an average molecular weight of 1,000 was reacted with 0.2 mol of tolylene diisocyanate (a mixture of 80% of tolylene-2,4-diisocyanate and 20% of tolylene-2,6-diisocyanate) at 80° C. for 3 hours, thereafter dissolved in an approximately equal part to the polyethylene glycol, of N,N'-dimethylformamide (hereinafter referred to as DMF) and after lowering the temperature of the solution, the solution was reacted with 0.2 mol of methylester of glycine at 30° C. for 30 minutes, to prepare polyethylene glycol diisocyanate.

On the other hand, 90 parts of epsilon-caprolactam and 10 parts of epsilon-aminocaproic acid were mixed with each other and melted at 170° C. in nitrogen gas atmosphere in a test tube and after cooling the temperature to 90° C., 7 parts of the above prepared polyethylene glycol diisocyanate were added and dissolved in the melt. Then, after maintaining the test tube at that temperature for an hour under atmospheric pressure, the temperature was elevated to 250° C. at which a polymerization was conducted for 5 hours. Upon cooling, was obtained a candle-like polymer which was melt spun at 270° C. to form a filament yarn. The spun yarn was cold drawn to 3.55 times its original length at 20° C. under 65% R.H. to obtain a drawn yarn.

Further, a control yarn of nylon-6 was prepared in the same manner and under the same conditions as above, except that polyethylene glycol was employed in lieu of the polyethylene glycol diisocyanate. Test results on those yarns are given in the following Table 1.

TABLE 1

| Yarn sample | $[\eta]$ | Aq. soluble content (percent) | Tenacity (g./den.) | Water absorbency (percent) Before washing | After 5 time washings |
|---|---|---|---|---|---|
| Present invention | 1.1 | 10.2 | 4.7 | 21.5 | 20.4 |
| Control | 1.0 | 14.5 | 4.2 | 20.1 | 13.1 |

The yarn of the present invention possessed an excellent water absorbency even after 5 time washings.

EXAMPLE 2

400 parts of polyethylene glycol having an average molecular weight of 4,000 was melted at 80° C. in a vessel and 50 parts of diphenylmethane-4,4'-diisocyanate were added thereto. The mixture was reacted at the above mentioned temperature for 3 hours under agitation to prepare polyethylene glycol diisocyanate.

On the other hand, 90 parts of epsilon-caprolactam and 10 parts of epsilon-aminocaproic acid were melt blended in the same manner as in Example 1 and to the melt was added a predetermined amount of the above obtained polyethylene glycol diisocyanate, whereafter the procedures same as in Example 1 were repeated. 10 series of the above process were performed, varying the addition amount of the polyethylene glycol diisocyanate, and 10 kinds of yarn sample were prepared. Test results on those samples will be given in Table 2 which follows:

TABLE 2

| Amount of diisocyanate added (percent) | $[\eta]$ | Aq. soluble content (percent) | Tenacity (g./den.) | Water absorbency (percent) |
|---|---|---|---|---|
| 0 | 1.0 | 9.7 | 4.4 | 9.0 |
| 0.05 | 1.0 | 9.6 | 4.5 | 9.0 |
| 0.1 | 1.0 | 9.5 | 4.5 | 9.7 |
| 0.5 | 1.0 | 9.7 | 4.4 | 11.1 |
| 1 | 0.9 | 10.0 | 4.3 | 13.7 |
| 5 | 0.9 | 10.5 | 4.0 | 16.5 |
| 10 | 0.8 | 11.2 | 3.8 | 18.6 |
| 15 | 0.8 | 11.2 | 3.2 | 19.2 |
| 30 | 0.7 | 14.1 | 2.7 | 21.5 |
| 35 | 0.6 | 17.5 | (¹) | |

¹ Not spinnable.

It is apparent from Table 2 above, when 0.1% or more of polyethylene glycol diisocyanate is incorporated, nylon-6 can be provided with an excellent water absorbing property.

EXAMPLE 3

Using polyethylene glycol having an average molecular weight of 2,000, polyethylene glycol diisocyanate was prepared in the same manner as in Example 1.

On the other hand, 90 parts of a nylon-66 chip having an inherent viscosity $[\eta]$ of 1.1 and 40 meq./kg. of amino end group were mixed sufficiently with 8 parts of the above mentioned polyethylene glycol diisocyanate, whereafter the mixture was charged, through a hopper, into an extruder heated at 280° C. and extruded to spin a filament yarn which was then drawn to 3.5 times its original length to obtain a drawn yarn $Y_1$ of 240 denier of 18 filaments.

Further, a control yarn $Y_2$ and a comparative yarn $Y_3$ were prepared in the same manner and under the same conditions as the above, except that, for the yarn $Y_2$, the polyethylene glycol diisocyanate was not incorporated and, for the yarn $Y_3$, polyethylene glycol having an average molecular weight of 2,000 was employed in lieu of the polyethylene glycol diisocyanate. Test results on those yarns are given in Table 3 which follows:

TABLE 3

| Yarn sample | Aq. soluble content (percent) | Tenacity (g./den.) | Elongation at break (percent) | Water absorbency (percent) 80% R.H. | Water absorbency (percent) 100% R.H. | Voltage of triboelectricity (viscosity) Before washing | Voltage of triboelectricity (viscosity) After washing |
|---|---|---|---|---|---|---|---|
| Y$_1$ | 1.4 | 4.4 | 23.4 | 6.6 | 18.5 | 230 | 250 |
| Y$_2$ | 0.7 | 4.7 | 20.2 | 5.1 | 9.7 | 1,200 | 1,200 |
| Y$_3$ | 5.8 | 4.8 | 21.0 | 5.3 | 11.2 | 350 | 1,000 |

As is apparent from Table 3 above, the yarn Y$_3$ which contained only polyethylene glycol had temporary hydrophilic and anti-electrostatic properties that could not withstand a washing treatment, while the yarn Y$_1$ of the present invention possessed durable antielectrostatic and hydrophilic properties.

EXAMPLE 4

400 parts of polyethylene glycol having an average molecular weight of 4,000 which had been absolutely dried in advance were melted at 80° C. in a vessel. After adding 50 parts of diphenylmethane - 4,4' - diisocyanate, the melt was reacted at the same temperature as the above for 3 hours under agitation. Then, 300 parts of DMF were added to the reactants and 31.8 parts of ethylester of epsilon-aminocaproic acid were further added thereto, maintaining the inner temperature at 27–30° C. while agitating. After the agitation was carried out for 30 minutes, the vessel was placed upon a boiling water bath, to distil out the DMF under a reduced pressure. Thus, obtained was polyethylene glycol biscarboxyethylester in a waxy form which had a saponification value of 0.392 meq./g. and a hydroxyl value of 0 meq./g.

Further, 100 parts of epsilon-caprolactam, 3 parts of water, 0.3 part of titanium dioxide, a small part of an inorganic manganate light stabilizer, 0.15 part of acetic acid and a predetermined amount, as shown in Table 4, of the aforementioned polyethylene glycol bis-carboxyethylester were introduced into an autoclave which was purged with nitrogen gas, and where the reaction mixture was heated at 260° C. for 3 hours under a gauge pressure of 1.5 kg./cm.$^2$ and further heated at 260° C. for 2 hours under atmospheric pressure while agitating. Thus a precondensation polymer was prepared. Next, the internal pressure was reduced until an absolute pressure of 300 mm. Hg was reached. After effecting a polycondensation reaction at 260° C. for 5 hours under the above mentioned reduced pressure, the resultant polymer was extruded in a form of a band from the bottom of the autoclave, pressurizing with nitrogen gas at 3 kg./cm.$^2$. The extruded polymer travelled through a quenching water pool, solidified and cut into a chip having a 3 mm. diameter and 3 mm. length. Eleven kinds of chips were prepared by performing eleven series of the above mentioned process, varying the addition amount of the polyethylene glycol bis-carboxyethylester.

On the other hand, as a control sample, another chip was prepared in the same manner and under the same conditions as the above, except that the polyethylene glycol bis-carboxyethylester was not added.

From each of the obtained chips were extracted aqueous soluble contents by washing with hot water at 80° C. for 20 hours and thereafter dried at 80° C. under a reduced pressure of 0.1 mm. Hg until its water content was reached to 0.069%.

The above mentioned chip was fed into a screw extruder type melt spinning apparatus and melt spun at 270° C. to form a yarn of 240 denier of 18 filaments which was taken up on a tube. The freshly spun undrawn yarn thus formed was cold drawn to 3.55 times its original length, at 20° C. under 65% R.H. The resultant yarns exhibited their properties as shown in Table 4 below.

TABLE 4

| Serial No. | Polymer PEG-BCE$_A$* added (percent) | Polymer [η] | Polymer Aq. soluble content (percent) | Fiber Tenacity (g./den.) | Fiber Elongation at break (percent) | Fiber Water absorbency (percent) 80% R.H. | Fiber Water absorbency (percent) 100% R.H. |
|---|---|---|---|---|---|---|---|
| 1 | 0 | 1.2 | 8.5 | 4.8 | 32.5 | 4.8 | 9.2 |
| 2 | 0.02 | 1.2 | 8.4 | 4.8 | 32.5 | 4.8 | 9.3 |
| 3 | 0.05 | 1.1 | 8.4 | 4.7 | 32.9 | 4.9 | 10.0 |
| 4 | 0.1 | 1.1 | 8.5 | 4.8 | 33.6 | 5.0 | 10.7 |
| 5 | 0.5 | 1.1 | 8.6 | 4.8 | 32.9 | 5.1 | 13.1 |
| 6 | 0.8 | 1.1 | 8.7 | 4.7 | 33.1 | 5.1 | 13.7 |
| 7 | 1 | 1.1 | 8.8 | 4.7 | 33.5 | 5.3 | 14.5 |
| 8 | 5 | 1.0 | 8.9 | 4.7 | 33.1 | 5.7 | 16.1 |
| 9 | 10 | 1.0 | 9.7 | 4.6 | 34.6 | 6.0 | 17.2 |
| 10 | 15 | 0.9 | 11.3 | 4.2 | 36.8 | 7.5 | 18.8 |
| 11 | 30 | 0.7 | 18.5 | 3.2 | 45.0 | 8.4 | 24.3 |
| 12 | 35 | 0.6 | 21.1 | Difficult to spin | | | |

*PEG-BCE$_A$=Polyethylene glycol bis-carboxyethylester.

It was understood from the test results as shown in Table 4 above that when the amount of the polyethylene glycol bis-carboxyethylester was in a range between 0.1 and 30%, a hydrophilic property was provided to the polyamide fiber without appreciable deterioration of its inherent desirable properties and, in particular, a good result was obtained in the case of the amount of the urethane derivative ranging 0.5–15%.

Next, the drawn yarns manufactured in the foregoing experiments, Serial Nos. 1–11, were knit into respective tricots of a back half texture which were subjected to washings successively with a washing agent and with water, followed by drying. The dried fabrics were stretched horizontally and a drop of water was dropped upon each fabric from 2 cm. up above. A time required for water to spread to a width of a circle having a diameter of 4 cm. was measured to determine a water absorbing velocity (sec.). The results are given in Table 5 which follows:

TABLE 5

| Serial number | PEG-BCE$_A$ added (percent) | Water absorbing velocity (sec.) |
|---|---|---|
| 1 | 0 | 360 |
| 2 | 0.02 | 285 |
| 3 | 0.05 | 113 |
| 4 | 0.1 | 42 |
| 5 | 0.5 | 23 |
| 6 | 0.8 | 15 |
| 7 | 1 | 9 |
| 8 | 5 | 5 |
| 9 | 10 | 2 |
| 10 | 15 | 2 |
| 11 | 30 | 2 |

Furthermore, the fiber containing 5% of polyethylene glycol bis-carboxyethylester, which was prepared in the foregoing experiment Serial No. 8, was subjected to 15 series of a washing treatment which comprises a sequence of a 30 minute soaping with 0.5% aqueous solution of an abluent and successive 3 time washings with hot water, each for 10 minutes. A change of water absorbency due to extraction of polyethylene glycol bis-carboxyethylester during the above mentioned treatments was measured. The result is given in the following Table 6.

TABLE 6

| Frequency of washing treatment: | Water absorbency under 100% R.H. (percent) |
|---|---|
| 1 | 16.0 |
| 3 | 15.8 |
| 5 | 15.7 |
| 10 | 15.7 |
| 15 | 15.5 |

As apparent from Table 6 above, the hydrophilic property had a durability to withstand repeated washings.

The results of the above mentioned experiments show that modified polyamide fibers of the present invention are provided with an excellent hydrophilic property durable to withstand repeated washings.

EXAMPLE 5

According to the same process as in Example 4, 0.1 mol each of polyethylene glycols differing in their average molecular weight was reacted with 0.2 mol of tolylene diisocyanate (a mixture of 80% of tolylene-2,4-diisocyanate and 20% of tolylene-2,5-diisocyanate) at 80° C., thereafter dissolved in DMF and, after lowering the temperature of the solution, the solution was reacted with 0.2 mol of methylester of glycine at 300° C. Thus, 7 kinds of polyethylene glycol bis-carboxymethylester were obtained. During a polycondensation reaction of epsilon-caprolactam, 5% each, based on the lactam, of the above obtained urethane derivatives of polyethylene glycol were added to the polycondensation reaction system under the same conditions as in Example 4, while as for a control sample, the above mentioned urethane derivative was not added, and 8 kinds of polyamide chip were prepared. The chips were subjected to a hot water washing followed by drying in the same manner as in Example 4, and melt extruded to form respective filament yarns which were drawn thereafter. Properties of the drawn yarns are given in Table 7 which follows:

ene glycol bis-carboxymethylester had an average molecular weight of 200–20,000, the polymerization reaction of epsilon-caprolactam involved no difficulty and nylon yarns having a hydrophilic property were obtained. Particularly good results were obtained when the average molecular weight of polyethylene glycol employed fell within a range of 400–10,000. Besides, the hydrophilic property provided to the fibers was durable enough to withstand repeated washings.

When polyethylene glycol having an average molecular weight of 40,000 was employed, the resulted fiber was discolored appreciably into an yellowish shade, while in the case of 10,000 or less, discoloration was not observed.

EXAMPLE 6

A polyethylene glycol bis-carboxymethylester was prepared by reacting 0.1 mol of polyethylene glycol having an average molecular weight of 2,000 with 0.2 mol of hexamethylene diisocyanate in the same manner as in Example 4, and by further reacting therewith 0.2 mol of methylester of gamma-hydroxypropionic acid. To the resultant reaction product was added 0.41 mol of DMF as a solvent. After dissolving the product in the solvent, 0.2 mol of hexamethylenediamine was added to the solution and refluxed for 5 hours. After distilling out DMF, a polyethylene glycol diamine was obtained in a waxy form.

On the other hand, 92 parts of a nylon-66 chip having an inherent viscosity [η] of 1.1 and 40 meq./kg. of its amino end group were mixed sufficiently with 8 parts of the above obtained powdery polyethylene glycol diamine, whereafter the mixture was charged, through a hopper, into an extruder heated at 280° C. and melt extruded to form an undrawn yarn of 240 denier of 18 filaments which was thereafter drawn to 3.5 times its original length.

Further, a control yarn and a comparative yarn were prepared by mix spinning and drawing in the same manner and under the same conditions as the above, except that, for the control yarn, the polyethylene glycol bis-carboxymethylester was not incorporated and, for the comparative yarn, polyethylene glycol having an average molecular weight of 2,000 was employed in lieu of the polyethylene glycol bis-carboxymethylester. Test results on the properties of those yarns are given in Table 8 which follows:

TABLE 8

| Yarn sample | content (percent) | Yarn property | | | Water absorbency (percent) | | Voltage of triboelectricity (v.) | |
|---|---|---|---|---|---|---|---|---|
| | | Tenacity (g./den.) | Elongation at break (percent) | | 80% R.H. | 100% R.H. | Before washing | After 5 time washings |
| Control | 0.7 | 4.7 | 20.2 | | 5.1 | 9.7 | 1,250 | 1,300 |
| Comparative | 5.8 | 4.8 | 21.0 | | 5.3 | 11.2 | 200 | 1,100 |
| This invention | 1.4 | 4.4 | 23.4 | | 6.6 | 18.5 | 160 | 18 |

Namely, as apparent from Table 8 above, in the case of incorporation of polyethylene glycol, most of the polyethylene glycol came off upon the washing treat-

TABLE 7

| Average M.W. of PEG used | Polymer | | Yarn property | | | |
|---|---|---|---|---|---|---|
| | [η] | Aq. soluble content (percent) | Tenacity (g./den.) | Elongation at break (percent) | Water absorbency (percent) | |
| | | | | | 80% R.H. | 100% R.H. |
| PEG-BCE_G* not added | 1.2 | 8.5 | 4.8 | 32.5 | 4.8 | 9.2 |
| 100 | 0.7 | 13.2 | 3.2 | 42.0 | 4.7 | 10.1 |
| 200 | 0.9 | 10.5 | 4.1 | 35.6 | 5.3 | 13.7 |
| 400 | 1.0 | 9.2 | 4.7 | 30.2 | 6.0 | 15.8 |
| 4,000 | 1.1 | 8.1 | 5.0 | 28.5 | 5.8 | 16.2 |
| 10,000 | 1.2 | 8.0 | 4.9 | 29.6 | 5.4 | 17.0 |
| 20,000 | 1.1 | 9.7 | 5.1 | 31.0 | 5.0 | 15.4 |
| 40,000 | 1.0 | 11.1 | 4.8 | 30.6 | 4.6 | 14.6 |

*PEG-BCE_G=Polyethylene glycol bis-carboxymethylester.

As apparent from Table 7 above, when the polyethylene glycol; i.e., one of the raw materials for the polyethyl- ment, so that a durable anti-electrostatic property was not provided to the fiber, whereas a fiber having a durable antielectrostatic property was obtainable according to the process of the present invention.

EXAMPLE 7

400 parts of polyethylene glycol having an average molecular weight of 4,000 which had been completely dehydrated in advance were melted at 80° C. in a vessel. With the melt, 50 parts of diphenylmethane-4,4'-diisocyanate were admixed and reacted at the same temperature as the above for 3 hours under agitation. Then, after adding 600 parts of toluene, a solution prepared by dissolving 30 parts of beta-aminoethane-sulphonic acid sodium salt in 120 parts of water was further added to the above mentioned reaction mixture while maintaining the inner temperature at 27–30° C. under agitation. The agitation was conducted for 30 minutes and thereafter the vessel was placed upon a boiling water bath to distil out toluene under a reduced pressure and an objective waxy polyethylene glycol sulphonic acid derivative was obtained.

Further, 5 parts of the thus obtained compound, 95 parts of epsilon-caprolactam, 3 parts of water, 0.3 part of titanium dioxide, a small part of inorganic manganate light stabilizer and 0.15 part of acetic acid were introduced into an autoclave and fater purging with nitrogen gas, sequential heatings, i.e., at 260° C. under a gauge pressure of 1.5 kg./cm.² for 3 hours and at 260° C. under atmospheric pressure for 2.5 hours, were conducted to obtain a prepolymer. Whereafter, the inner pressure was reduced to an absolute pressure of 300 mm. Hg and a polycondensation reaction was effected at 260° C. for 5 hours. Upon completion of the reaction, the polymer was extruded in a form of a band from the bottom of the autoclave, pressurizing with nitrogen gas at 3 kg./cm.². The extruded polymer travelled through a quenching water pool, was solidified and was cut into a chip having a 3 mm. diameter and a 3 mm. length.

On the other hand, as a control sample, another chip was manufactured in the same manner and under the same condition as the above, except that the polyethylene glycol sulphonic acid derivative was not added.

Each of the above obtained chips was washed in water at 80° C. for 20 hours to extract water soluble contents therefrom and dried at 80° C. under a reduced pressure of 0.1 mm. Hg until its water content reached to 0.069%.

Using a screw extruder type melt spinning apparatus, each of the above mentioned dried chips was melt spun at 270° C. to form an undrawn yarn of 240 denier of 18 filaments which was taken up on a tube. The thus formed undrawn yarn was cold drawn to 3.59 times its original length at 20° C. under 65% R.H., and obtained was a drawn yarn having properties as shown in the following Table 9.

The result shown above remained unchanged even when the frequency of washing was increased. Therefore, it is clarified by Table 9 that polyethylene glycol sulphonic acid derivative incorporated into polyamide or its fiber does not come off the polymer, so that it provides the fiber with durable antielectrostatic and hydrophilic properties.

EXAMPLE 8

A derivative of polyethylene glycol sulphonic acid was prepared under the entirely same condition as in Example 7, except that polyethylene glycol having an average molecular weight of 2,000 was employed. 90 parts of control nylon-6 chip prepared in Example 10 and 10 parts of the compound above obtained and granulated were mixed well with each other, fed into a hopper from which air was excluded and then extruded in a form of a band from a mono-screw extruder having its barrel diameter of 40 mm., at 260° C. The band was cut into a chip which was dried at 80° C. under a reduced pressure of 0.1 mm. Hg and subjected to spinning and drawing processes under the same conditions and in the same manner as in Example 7, to obtain a drawn yarn of 70 denier of 18 filaments. The polymer and the yarn possesses their properties shown in the following Table 10.

TABLE 10

| Blend polymer | Yarn property | | | | |
|---|---|---|---|---|---|
| | | | | Water absorbency (percent) | Voltage of triboelectricity (v.) |
| [η] | Aq. soluble content (percent) | Tenacity (g./den.) | Elongation at break (percent) | 80% R.H. | 100% R.H. | |
| 1.1 | 0 | 4.7 | 38.2 | 8.7 | 22.3 | 50 |

In Table 10 above, both the water absorbency and the voltage of triboelectricity were measured on the sample after washing 5 times as in Example 7 and even after more washings were repeated, those values remained substantially unchanged. From the above experiment, the provision of durable antielectrostatic and hydrophilic properties to condensation polymers according to the process of the present invention was ascertained.

EXAMPLE 9

Polyethylene glycol having one of its hydroxyl end groups blocked by a methyl radical and having an average molecular weight of 1,000, was completely dehydrated. 0.3 mol of the thus dehydrated polyethylene glycol was weighed out and introduced into an autoclave, where 0.3 mol of hexamethylene diisocyanate was admixed and reacted therewith at 80° C. for 5 hours under agitation. Then, 500 g. of toluene were added and dissolved the reaction mixture therein. A solution prepared by dissolving 0.6 mol of 1-amino-3-sodiumcarboxy-propane-2-sulphonic acid soda in 50 g. of water was further added and reacted therewith for 30 minutes maintaining the inner temperature at 27–30° C. under agitation. Whereafter, toluene and water were distilled out under a reduced pressure on a boiling water bath and an objective greasy product was obtained.

On the other hand, a solution prepared by dispersing and dissolving 81 parts of nylon–66 salt in 55 parts of

TABLE 9

| Yarn sample | [η] | Aq. soluble content (percent) | Tenacity (g./den.) | Elongation at break (percent) | Water absorbency (percent) | | Voltage* of triboelectricity (v.) |
|---|---|---|---|---|---|---|---|
| | | | | | 80% R.H. | 100% R.H. | |
| Present invention | 1.2 | 9.0 | 4.8 | 32.6 | 6.3 | 16.1 | 100 |
| Control | 1.2 | 8.6 | 4.9 | 35.1 | 4.8 | 9.2 | 1,600 |

*After washing 5 times.

water was charged in an autoclave previously purged sufficiently with nitrogen gas, where a reaction was effected for 3 hours at an inner temperature of 300° C., under an inner pressure of 6 kg./cm.², and after reducing the inner pressure to atmospheric pressure, the reaction was further effected for an hour.

Whereafter, 30 parts of the greasy product above obtained were incorporated and a reaction was effected for 30 minutes under atmospheric pressure while agitating. Then after stopping the agitation, the inner pressure was reduced to 300 mm. Hg under which pressure the reaction was further carried out for an hour at 280° C. When the reaction was completed, nitrogen gas was introduced into the autoclave and the polymer was extruded in a form of a band from the bottom of the autoclave being pressurized at 3 kg./cm.². The extruded polymer was quenched and solidified in a quenching water pool and cut into a chip.

Further, 50 parts of a nylon–66 chip having an inherent viscosity [η] of 1.2 and 40 meq./kg. of amino end group were blended well with 50 parts of the chip above obtained which had been sufficiently dried. The blend chips were fed into a hopper and melt spun from an extruder at 280° C. and an undrawn yarn of 240 denier of 18 filaments was obtained. The undrawn yarn was not drawn to 3.5 times its original length, passing on a roll heated at 90° C. As a control yarn, a nylon–66 yarn was prepared by melt spinning a nylon–66 chip solely in the same manner and under the same conditions as the above, while, as a comparative yarn, the aforementioned methoxylated polyethylene glycol having the same average molecular weight as the above was prepared by polycondensing with a nylon-66 chip which was prepared by polycondensing nylon–66 in the same manner and under the same conditions as the above and a yarn was prepared by spinning and drawing the blend chip.

Those yarns had their properties as shown in the following Table 11.

TABLE 11

| Yarn sample | [η] | Aq. soluble content (percent) | Tenacity (g. den.) | Elongation at break (percent) | Water absorbency (percent) | Voltage of triboelectricity (v.) |
| --- | --- | --- | --- | --- | --- | --- |
| Present invention | 1.0 | 2.5 | 4.3 | 26.8 | 25.6 | 30 |
| Comparative (CH₃O·PEG added) | 1.0 | 12.8 | 4.5 | 25.5 | 15.4 | 800 |
| Control (no additive) | 1.1 | 1.3 | 4.6 | 20.4 | 9.5 | 1,20 |

The water absorbency and both the voltage of triboelectricity were measured on samples after washing 5 times, same as in Example 7, and even when after more washings were repeated, those values remained substantially unchanged.

As apparent from the above, the methoxypolyethylene glycol itself readily comes off the fiber, while according to the process of the present invention, the urethane derivative scarcely comes off, so that durable antielectrostatic and hydrophilic properties can be provided to nylon fibers.

What is claimed is:

1. A polymer composition consisting essentially of a fiber-forming polyamide having uniformly distributed therein from 0.1–30% by weight, based on said polyamide, of at least one urethane derivative of polyether selected from the group consisting of:

$R_2(OR_1)_nO$—$CONHR_3NCO$,
$R_2CO(OR_1)_nO$—$CONHR_3NCO$,
$OCNR_3NHCO$—$(OR_1)_nO$—$CONHR_3NCO$,
$R_2(OR_1)_nO$—$CONHR_3NHCO$—$NHR_4COOR_6$,
$R_2CO(OR_1)_nO$—$CONHR_3NHCO$—$NHR_4COOR_6$,
$R_2(OR_1)_nO$—$CONHR_3NHCO$—$OR_4COOR_6$,
$R_2CO(OR_1)_nO$—$CONHR_3NHCO$—$OR_4COOR_6$,
$R_6OOCR_4NH$—$CONHR_3NHCO$—$(OR_1)_nO$—$CONHR_3NHCO$—$NHR_4COOR_6$,
$R_6OOCR_5O$—$CONHR_3NHCO$—$(OR_1)_nO$—$CONHR_3NHCO$—$OR_5COOR_6$,
$R_2CO(OR_1)_nOCONHR_3NHCO$—$X$
and
$X$—$CONR_3NHCO(OR_1)_nOCONHR_3$—$NHCO$—$X$ wherein $n$ is an integer of 4–460; $OR_1$ denotes an alkyleneether group having 1–18 carbon atoms; $R_2$ denotes hydrogen atom, an alkyl group having 1–18 carbon atoms, an aryl group or a cycloalkyl group having 1–18 carbon atoms; $R_3$ denotes an alkylene, phenylene or cycloalkylene group, having 1–18 carbon atoms; $R_4$ and $R_5$ denote an alkylene or phenylene group having 1–12 carbon atoms; $R_6$ denotes hydrogen atom or an alkyl group having 1–12 carbon atoms; and X is (A) a residue obtained by removing a hydrogen atom from the amino group of an aminosulphonic acid or the hydroxyl group of a hydroxy-sulfonic acid, or an alkali metal salt thereof, or (B) an alkali metal sulphonate radical.

2. A polymer as claimed in claim 1 wherein the $(OR_1)_n$ is polyethyleneoxide, polypropyleneoxide, polytetramethyleneoxide, or a block or random copolymer of ethyleneoxide and propyleneoxide.

3. A polymer as claimed in claim 2 wherein $n$ is an integer of 9–230.

4. A polymer as claimed in claim 1 wherein the $(OR_1)_n$ is a mixture of a plurality of aliphatic ethers differing in their carbon number.

5. A polymer as claimed in claim 1. wherein the urethane derivative of polyether is selected from the group consisting of:

$R_2(OR_1)_nOCONHR_3NHCO$—$X$,
$R_2CO(OR_1)_nOCONHR_3NHCO$—$X$,
and
$X$—$CONHR_3NHCO(OR_1)_nOCONHR_3NHCO$—$X$ wherein X is a residue of an aliphatic compound represented by the formula,

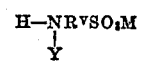

or $HOR^VSO_3M$
where, $R^V$ represents

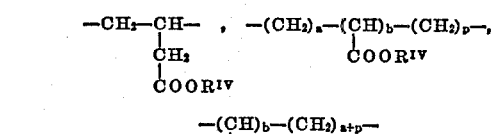

or

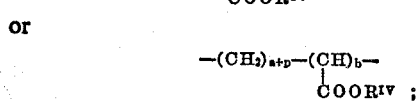

$R^{IV}$ represents hydrogen atom, an alkali metal or a lower alkyl group; and Y represents hydrogen atom or a lower alkyl group, wherein relations $a+p=1$ to 5 and $b=0$ to 1 are satisfied.

6. A polymer as claimed in claim 1, wherein the urethane derivative of polyether is selected from the group consisting of:

$R_2(OR_1)_nOCONHR_3NHCO$—$X$,
$R_2CO(OR_1)_nOCONHR_3NHCO$—$X$
and
$X$—$CONHR_3NHCO(OR_1)_nOCONHR_3NHCO$—$X$ wherein X is a residue of an alicyclic compound represented by the formula,

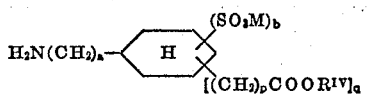

or

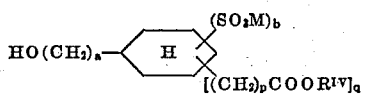

where, $R^{IV}$ represents hydrogen atom, an alkali metal or a lower alkyl group; and relations, $a=0$ to 3, $b=1$ to 3, $p=0$ to 1 and $q=0$ to 1 are satisfied.

7. A polymer as claimed in claim 1, wherein the urethane derivative of polyether is selected from the group consisting of:
$R_2(OR_1)_nOCONHR_3NHCO—X$,
$R_2CO(OR_1)_nOCONHR_3NHCO—X$
and
$X—CONHR_3NHCO(OR_1)_nOCONHR_3NHCO—X$
wherein X is a residue of an aromatic compound represented by the formula,

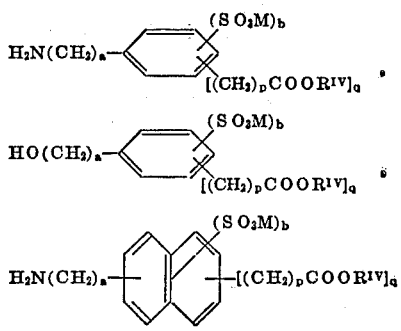

or

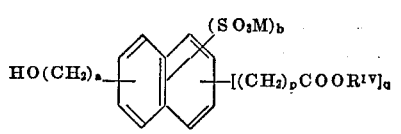

where, $R^{IV}$ represents hydrogen atom, an alkali metal or a lower alkyl group; and relations, $a=0$ to 3, $b=0$ to 3, $p=0$ to 1 and $q=0$ to 1 are satisfied.

8. A polymer as claimed in claim 1, wherein the urethane derivative of polyether is selected from the group consisting of:
$R_2(OR_1)_nOCONHR_3NHCO—X$,
$R_2CO(OR_1)_nOCONHR_3NHCO—X$
and
$X—CONHR_3NHCO(OR_1)_nOCONHR_3NHCO—X$
where, X is acid sodium sulphite.

9. A polymer as claimed in claim 1, wherein the amount of the urethane derivative is 0.5–15% by weight based on the polyamide.

10. A polymer as claimed in claim 1, wherein the amount of the urethane derivative is 1–10% by weight based on the polyamide.

11. A polymer as claimed in claim 1, wherein the polyamide is a polycondensation product of an ω-lactam, an ω-aminocarboxylic acid, or a salt of a diamine and a dicarboxylic acid; the urethane derivative is selected from the group consisting of:
$R_2CO(OR_2)_nOCONHR_3NCO$
$R_2(OR_2)_nOCONHR_3NCO$
and
$OCNR_3NHCO—(OR_1)_nOCONHR_3NCO$.

12. A polymer as claimed in claim 1, wherein the polyamide is poly-epsilon-caproamide or polyhexamethylene adipamide.

13. A fiber comprising a polymer as claimed in claim 1.

14. A process for producing a polymer as claimed in claim 1, which comprises incorporating 0.1–30 parts by weight of at least one urethane derivative of polyether selected from the group consisting of:
$R_2(OR_1)_nO—CONHR_3NCO$,
$R_2CO(OR_1)_nO—CONHR_3NCO$,
$OCNR_3NHCO—(OR_1)_nO—CONHR_3NCO$,
$R_2(OR_1)_nO—CONHR_3NHCO—NHR_4COOR_6$,
$R_2CO(OR_1)_nO—CONHR_3NHCO—NHR_4COOR_6$,
$R_2(OR_1)_nO—CONHR_3NHCO—OR_4COOR_6$,
$R_2CO(OR_1)_nO—CONHR_3NHCO—OR_4COOR_6$,
$R_6OOCR_4NH—CONHR_3NHCO—(OR_1)_nO—CONHR_3NHCO—NHR_4COOR_6$,
$R_6OOCR_5O—CONHR_3NHCO—(OR_1)_nO—CONHR_3NHCO—OR_5COOR_6$,
$R_2(OR_1)_nOCONHR_3NHCO—X$
$R_2CO(OR_1)_nOCONHR_3NHCO—X$ and
$X—[ONCR]CONHR_3NHCO(OR_1)_n$
OCONHR_3NHCO—X
wherein, $n$ is an integer of 4–460; $OR_1$ denotes an alkyleneether group having 1–18 carbon atoms; $R_2$ denotes hydrogen atom, an alkyl group having 1–18 carbon atoms, an aryl group or a cycloalkyl group having 1–18 carbon atoms; $R_3$ denotes an alkylene, phenylene or cycloalkylene group, having 1–18 carbon atoms; $R_4$ and $R_5$ denote an alkylene or phenylene group having 1–12 carbon atoms; $R_6$ denotes hydrogen atom or an alkyl group having 1–12 carbon atoms; and X is (A) a residue obtained by removing a hydrogen atom from the amino group of an aminosulphonic acid or the hydroxyl group of a hydroxysulfonic acid, or an alkali metal salt thereof, or (B) an alkali metal sulphonate radical, uniformly into 100 parts by weight of fiber-forming polyamide, before, during or after a polycondensation reaction of the said polyamide.

15. A process according to claim 14, wherein the amount of the urethane derivative is 0.5–15 parts by weight.

16. A process according to claim 14, wherein the amount of the urethane derivative is 1–10 parts by weight.

17. A process according to claim 14, wherein the urethane derivative is selected from the group consisting of:
$R_2(OR_1)_nOCONHR_3NCO$,
$R_2CO(OR_1)_nOCONHR_3NCO$
and
$OCNR_3NHCO—(OR_1)_nOCONHR_3NCO$;
and the condensation polymer is a polycondensation product of an ω-lactam, an ω-aminocarboxylic acid, or a salt of a diamine and a dicarboxylic acid.

18. A process according to claim 17, wherein the urethane derivative is incorporated with the raw material of the polyamide and which further comprises heating the mixture at 80–100° C. for 1–2 hours prior to a polycondensation reaction.

19. A process according to claim 17, wherein the urethane derivative is incorporated with the polyamide at around the end of the polycondensation reaction, and which further comprises heating the mixture to effect an inter-reaction between the polyamide and the urethane derivative within an hour.

20. A process according to claim 17, wherein the urethane derivative is incorporated with the polyamide after the polycondensation reaction and which further comprises heating the mixture at 240–260° C. for 40 minutes or less.

21. A process according to claim 20, wherein the heating is effected for 15–30 minutes.

22. A process according to claim 14, wherein the polyamide is poly-epsilon caproamide or polyhexamethylene adipamide.

23. A polymer as claimed in claim 1, in which the condensation polymer is a copolyamide of epsilon-caprolactam and epsilon-aminocaproic acid, and in which the urethane derivative is the product of the reaction of polyethylene glycol with diphenylmethane-4,4'-diisocyanate.

References Cited

UNITED STATES PATENTS

| | | | |
|---|---|---|---|
| 3,428,710 | 2/1969 | Daumiller et al. | 260—857 |
| 3,152,920 | 10/1964 | Caldwell et al. | 117—138.8 |
| 3,654,235 | 4/1972 | Crovatt et al. | 260—78 |

LESTER L. LEE, Primary Examiner

U.S. Cl. X.R.

260—47 CB, 75 N, 75 TN, 78 L, 78 SC, 78 UA, 855, Dig. 21

UNITED STATES PATENT OFFICE
CERTIFICATE OF CORRECTION

Patent No. 3,810,956        Dated May 14, 1974

Inventor(s) Isao Kimura, Fumimaro Ogata and Koichiro Ohtomo

It is certified that error appears in the above-identified patent and that said Letters Patent are hereby corrected as shown below:

Col. 18, before the first line thereof; insert as an additional formula ---$R_2(OR_1)_nOCONHR_3NHCO-X$,---.

Col. 18, line 3; delete in its entirety and replace with ---$X-CONHR_3NHCO(OR_1)_nOCONHR_3NHCO-X$---.

Col. 18, line 21; change "Claim 2" to ---Claim 1---.

Col. 19, line 70; change "$R_2CO(OR_2)_nOCONHR_3NCO$" to ---$R_2(OR_1)_nOCONHR_3NCO$,---.

Col. 19, line 71; change "$R_2(OR_2)_nOCONHR_3NCO$" to ---$R_2CO(OR_1)_nOCONHR_3NCO$---.

Col. 20, line 19; delete "[ONCR]".

Col. 20, line 21; change "wherein," to ---where,---.

Signed and sealed this 8th day of October 1974.

(SEAL)
Attest:

McCOY M. GIBSON JR.
Attesting Officer

C. MARSHALL DANN
Commissioner of Patents